United States Patent [19]

Bond

[11] 4,144,556
[45] Mar. 13, 1979

[54] OMNI-DIRECTIONAL PHOTOGRAPHIC ILLUMINATION APPARATUS

[76] Inventor: George S. Bond, c/o The George S. Bond Company, 6349 N. Guilford Ave., Indianapolis, Ind. 46220

[21] Appl. No.: 871,347
[22] Filed: Jan. 23, 1978
[51] Int. Cl.² .............................................. G03B 15/02
[52] U.S. Cl. .................................... 362/16; 362/347; 362/350
[58] Field of Search ......................... 362/16, 347, 350

[56] References Cited

U.S. PATENT DOCUMENTS 3,088,023  4/1963  Ayroldi ........................... 362/347 X

*Primary Examiner*—Stephen J. Lechert, Jr.
*Attorney, Agent, or Firm*—Jenkins, Coffey & Hyland

[57] ABSTRACT

An object to be photographed is illuminated with substantially omni-directional, glare-free lighting. The object is placed within an ovoidal shell, inward from an access opening at one end, and supported on a platform formed by a flattened bottom surface of the shell. The entire inner surface of the shell is a light-diffusing surface and is illuminated by a light source which is shielded from direct illumination of the object. The ovoidal diffusing surface reflects light back and forth from and onto itself to produce substantially uniform omni-directional illumination within the shell. The object is supported far enough inward from the access opening of the shell to receive such omni-directional illumination so that it is well lighted for photographing and, in the absence of direct-lighting illumination, appears substantially glare-free. Any highlights desired for photographic purposes are produced by direct lighting from a suitable source, as by controlled direct lighting from the main light source or from a supplemental lamp.

12 Claims, 6 Drawing Figures

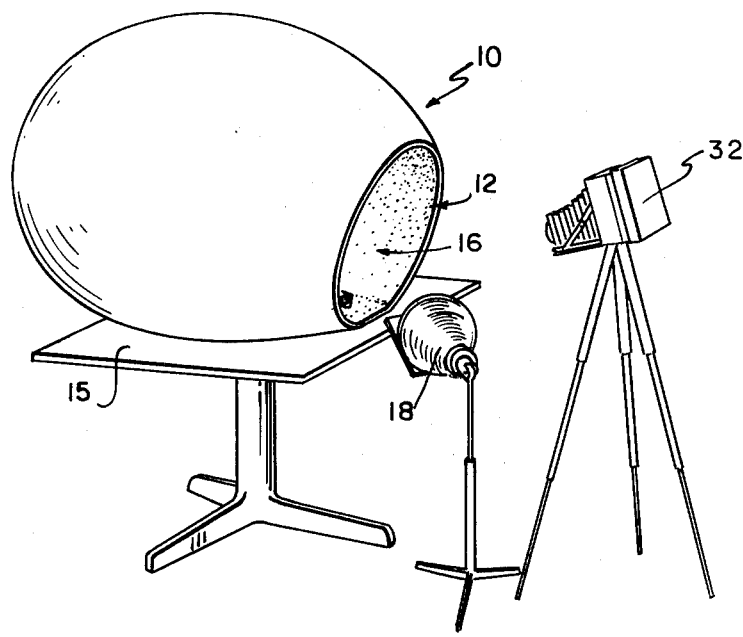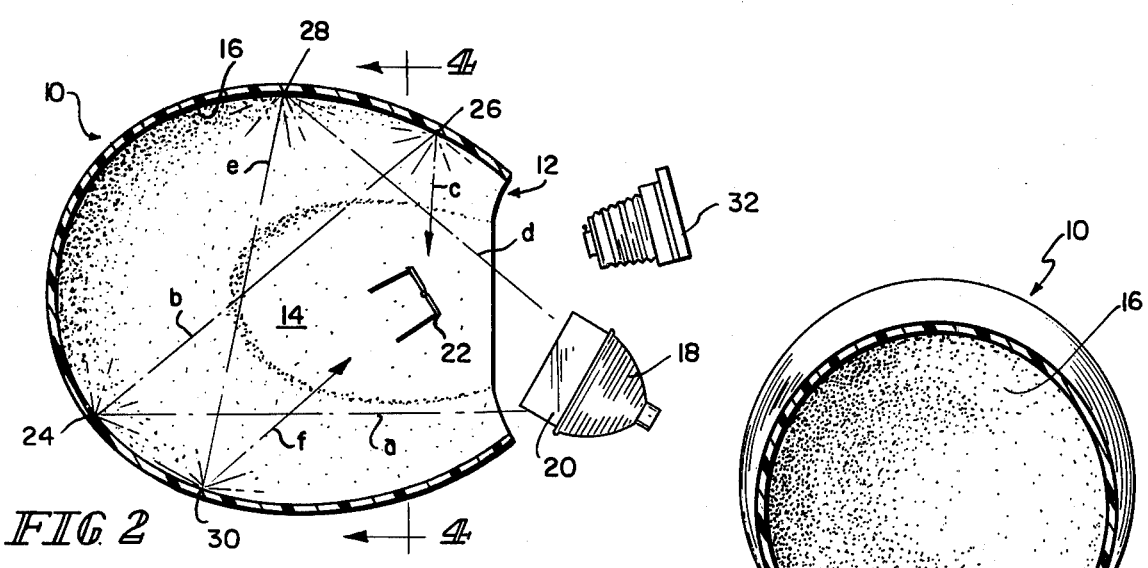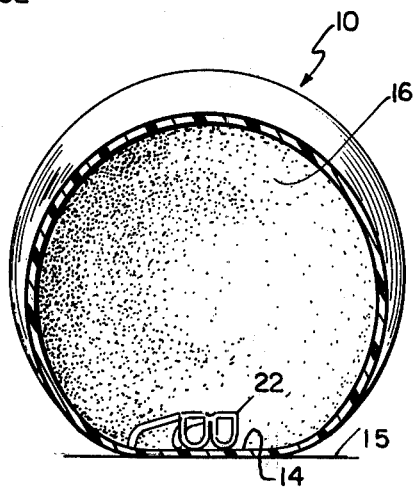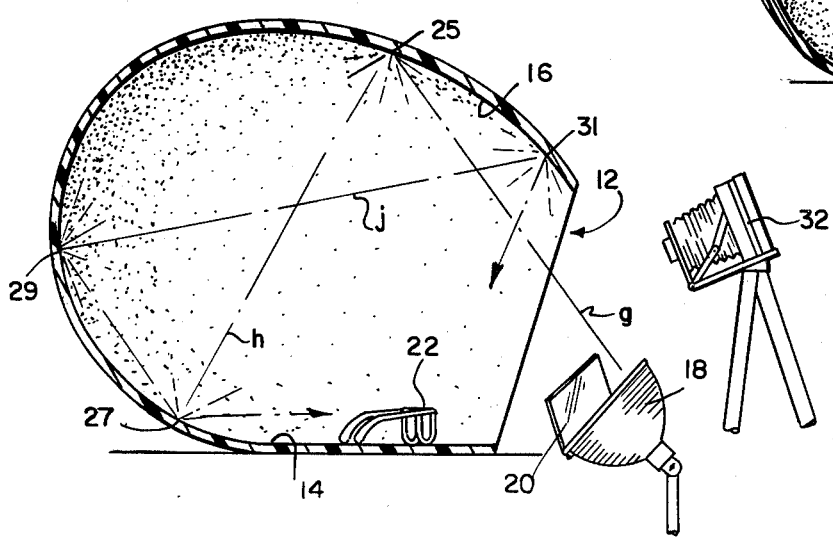

OMNI-DIRECTIONAL PHOTOGRAPHIC ILLUMINATION APPARATUS

This invention relates to the illumination of objects for photographic purposes, especially small objects of which eye glass frames may be considered an example.

The illumination of photographic objects is a major factor in photography and photographers go to great lengths in seeking to produce desired lighting conditions. This is especially true in photographing small objects for catalog or advertising or other commercial purposes. An optimum condition would be to have general lighting which illuminates the object uniformly from all directions without producing glare, and producing only soft shadow, if any. Any desired highlights can then be added with supplemental lamps.

It is the object of the present invention to provide means for producing omni-directional illumination of photographic objects. The means is especially suitable for use with small objects and has been advantageously used in photographing eye glass frames for reproduction both in printed information manuals and in microfiche publications.

In accordance with the invention, the illumination apparatus comprises a shell of spheroidal shape, preferably of ovoidal or prolate spheroidal shape with an access opening at one end to permit insertion and removal of objects to be photographed and to expose such objects to view of a camera mounted outside the shell. Means is provided to support the object within the shell, inward from the opening. Such support is preferably a platform formed by a bottom flattened portion of the shell which is smoothly blended or faired into the adjacent shell wall. The portion of the supporting platform is such that the shell wall projects beyond the support position toward the access opening and slopes inward so as to reflect light onto the front portions of the supported object.

The inner surface of the shell is made to be a light diffusing surface, and means is provided to illuminate such surface. Such means may be a lamp which projects light into the shell through the access opening and is positioned and shielded to avoid direct illumination of the photographic object. The light illuminates the inner diffusing surface of the shell and is diffusely reflected thereby onto other portions of the surface which in turn reflect and diffuse the light, so that all portions of the surface are illuminated from any directions and reflect light diffusely inward in many directions. Light is thus diffusely reflected toward the position of the photographic object from all portions of the surface, and the subject receives diffused light from substantially all directions and is illuminated without glare.

A shell of generally spheroidal shape which is geometrically smooth and well formed is desirable to produce the desired even omni-directional illumination. An ovoidal shape is preferred, especially since it permits an end access opening and provides a convenient object position well spaced inward from such opening with the shell wall extending forward to cast light onto the frontal portions of the photographic object. The inner surface of the shell is desirably a highly diffusing surface. Because of its diffusing character, it will mask considerable variation in the shape of the shell wall, and substantial variation from a geometrically even curvature in the wall can be tolerated. This factor also permits the shell to be made in sections, e.g., halves, rather than as one-piece, without substantially impairing the desired even omni-directional lighting.

It has been found convenient and desirable to illuminate the interior of the shell with light projected into the shell through the main access opening, but other means of illumination may be used. It is contemplated that all or part of the shell wall can be made translucent and light supplied by transmission through such translucent wall. The position and area of illumination may be used to produce different light intensity patterns within the shell.

The accompanying drawings illustrate the invention and show embodiments exemplifying the best mode of carrying out of the invention as presently perceived. In such drawings:

FIG. 1 is a perspective view of preferred omnidirectional illuminating apparatus in accordance with the invention;

FIG. 2 is a horizontal sectional view of the apparatus shown in FIG. 1;

FIG. 3 is a vertical sectional view of the apparatus shown in FIG. 1;

FIG. 4 is a transverse sectional view on the line 4—4 of FIG. 2;

Figure 5:
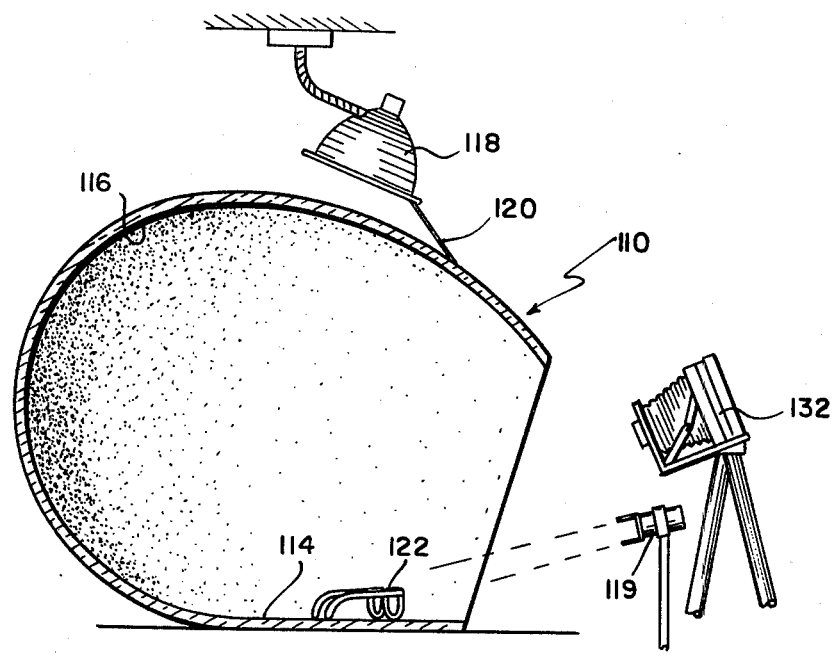
FIG. 5 is a vertical sectional view, similar to FIG. 3, showing of modification in which the shell is of translucent material.

The apparatus shown in FIG. 1 comprises a shell 10 of ovoidal shape, formed of substantially opaque material such as fiberglass. The shell is cut away at one end to form an access opening 12 of a diameter preferably not substantially greater than half the overall cross-sectional diameter of the shell. At the bottom of the shell, over an area extending from the bottom of the opening 12 inward about half the length of the shell, the bottom wall of the shell is flattened to form a platform 14. This forms a flat surface by which the shell may be supported on a table 15, and forms inside the shell a flat surface for supporting objects to be photographed, such as the eye glass frame 22 shown. As indicated in the drawings, the platform wall is smoothly blended or faired into the curved ovoidal wall of the shell so as to avoid any sharp or perceptible break in the smooth contour of the inner surface of the shell.

The inner surface 16 of the shell is a light-diffusing surface. When the shell is made by laying up fiberglass on a smooth form, the light-diffusing characteristics of the shell may be provided by first and blasting such surface over its entire area, and then applying a flat paint to that surface.

The interior of the shell is illuminated from a suitable light source. As shown in FIGS. 1–4, the light source is a lamp 18 mounted opposite the access opening 13 and to one side, and directed toward the opening 12 so as to project light into the shell and against its inner surface 16. Preferably, the lamp 18 is provided with a shield or shade 20 which is positioned to prevent light from the lamp 18 from directly illuminating the photographic object. As shown in FIGS. 2 and 3, light from the lamp 18 directly strikes an area of the inner surface 12 of the shell, and is diffusely reflected from that surface. For example, an individual ray a from the lamp 18 strikes the surface 16 at the point 24 and is diffusely reflected from that surface over a wide angle so that light from the point 24 is effectively reflected toward a large portion of the other parts of the surface 16. Thus an individual reflected ray b strikes the shell surface 16 at the point 26, and is diffusely reflected from that point over a wide angle toward the same and other portions of the shell surface 16. As shown, the reflection point 26 is in the converging front portion of the ovoidal shell, between the position of the photographic object 22 and the access opening 12, where the shell projects beyond the photographic object 22 and curves inward toward the opening 12. Accordingly, some of the light reflected from the point 26, for example the ray c, is directed toward the photographic object 22 to illuminate the front portion of that object. Another exemplary ray d from the lamp 18 strikes the surface of the shell at the point 28 and is diffusely reflected therefrom to other portions of the diffusing surface 16 of the shell. One ray e reflected from that point strikes the shell at the point 30 and is diffusely reflected thereby to still other portions of the shell surface. Some of such reflected light, for example the ray f, is reflected toward the photographic object 22 and against the rearward portions of it.

Similarly, as shown in FIG. 3, an exemplary ray g from the lamp 18 strikes the shell surface 16 at the point 25 and is diffusely reflected therefrom to other parts of the surface. One reflected ray h, for example, strikes the shell at the point 27 and is diffusely reflected thereby so as to direct light both toward the rear of the eye glass frame 22 and also toward the rear of the shell, as to the point 29. There light is further diffusely reflected to the overhanging front portion of the shell, as along the ray j to the point 31, and thence diffusely reflected downward and rearward toward the eye glass frame 22.

There is thus within the shell an area which is directly illuminated by the lamp 18, and the light of the primary illumination is diffusely reflected from all points of the primarily illuminated area toward other portions of that area and other portions of the shell. The light is repeatedly diffused and reflected by the light diffusing surface 16, from many points on that surface to other points on that surface, and from substantially the whole surface toward the photographic object. While the light diffusely reflected from any one point or small area will not have the same intensity in all directions, the combination of the generally spheroidal shape of the shell, its surrounding relation to the photographic object, and the light-diffusing inner surface, will produce the diffuse reflection between and from the many points on that surface, and produce a generally uniform diffusion or glow of omni-directional light within the shell. That omni-directional diffused light illuminates the photographic object 22 from substantially all directions, with a substantially uniform glarefree lighting effect which produces only soft shadow, if any.

Such illumination is highly advantageous for the photographing of small objects, for purposes of advertising, catalog illustrations and other commercial applications, since it brings out the details of such objects without producing specular reflection or glare and without producing shadows. If highlights or shadows are desired in the photographic image, a controlled amount of light may be cast directly onto the photographic object 22 from any suitable source to produce the desired highlights and shadows. The controlled highlighting illumination may be produced, for example, by making the shade 20 fo the lamp 18 of a partially light-transmitting character, so that some light of controlled quantity and character is passed directly from the lamp 18 through the shade 20 onto the photographic object 22.

The illuminated eye glass frame 22 or other photographic object is accessible for photographing through the access opening 12, and for this purpose, a camera 22 may be mounted outside that opening and to the side of the lamp 18. The opening is large enough to permit considerable variation in the position of the camera, as may be desired by the photographer.

The modification shown in FIG. 5 comprises a shell 110 having a configuration like that of the shell in FIG. 1. In this case, the shell is made of translucent material, for example, of transparent or translucent plastics material. The ovoidal shell has a flatted bottom portion forming a platform 114 for supporting an object to be photographed, such as the eye glass frame 122 shown. The inside surface 116 of the shell 110 is a light-diffusing surface, for example, a surface produced by sand blasting the inner face of the shell or coating the same with a translucent light-diffusing and reflecting coating, or both. With such a transparent shell 110, the main illumination of the interior of the shell may be produced by a lamp 118 positioned to cast light against and through the translucent or transparent wall of that shell. As shown, the lamp 118 is mounted above the shell 110 and directed to illuminate its top surface. The light passes through the top wall and is diffused by its inner face toward other portions of the diffusely reflecting surface 116 of the shell. As in the shell of FIG. 1, the light is diffusely reflected from substantially all portions of the wall of the shell 110 so as to produce a diffusion or glow of omni-directional light within the shell. The lamp 118 may be shielded from the camera by a shade 120.

With a translucent shell, the location and especially the intensity of light from the lamp 118 may be varied to produce special effects or patterns of intensity in the diffusion or glow of omni-directional light within the shell. For example, if the lamp 118 is made to produce high intensity illumination over a small area of the translucent wall, this will produce a higher intensity of light which is transmitted from that area toward the eye glass frame 122 or other photographic object. Such high intensity diffused lighting will be part of a lighting pattern which includes the basic diffusion or glow of omni-directional light within the shell, and the photographic object will be clearly illuminated in all its detail by the diffused omni-directional light, but will also receive higher intensity diffused light from a particular direction.

Instead of or in addition to producing higher intensity diffused lighting from a general direction, the photographic object may be illuminated by direct light rays to produce desired highlights or shadows. As shown in FIG. 5, a highlight lamp 119 is mounted in a position to cast direct light rays onto the eye glass frame 122 from a selected direction so as to produce desired highlights on that eye glass frame 122 as viewed by the camera 132.

Figure 6:
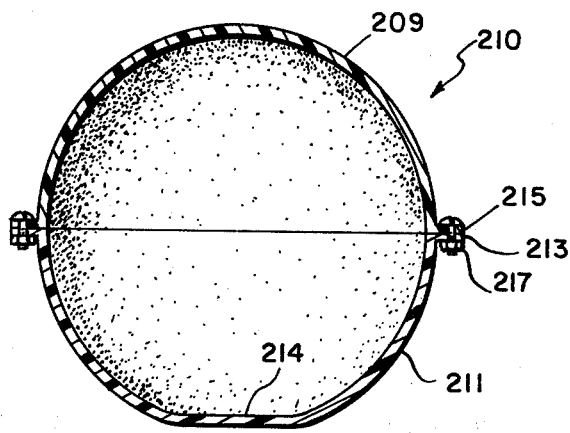
FIG. 6 is a transverse sectional view of a modification in which the shell is made in upper and lower separable halves.

The modification, as shown in FIG. 6, comprises a shell 210 similar to the shells 10 and 110 of FIGS. 1–5 except that in this case, the shell is made of two separable halves. The bottom half 211 is similar in shape to the bottom half of the shell of FIG. 1 and includes a bottom platform 214. The bottom half is separated from the upper half 209 in a generally horizontal plane, and its edge is provided with a flange 213 adapted to be bolted to a corresponding flange of the upper half. The upper half 209 is similar in configuration to the upper half of the shell of FIG. 1 and is provided at its edge with a flange 215 which mates with the flange 213 of the lower half 211. The two flanges are secured together in any suitable matter, here shown as by bolts 217.

Separation of the shell into two or more parts will facilitate manufacture and handling and shipment of the shells. It is contemplated that the shells may be separated in other than horizontal planes, for example, in a vertical plane, although a generally horizontal separation plane is preferred. While separation of the shell into two or more parts will produce observable lines of separation on the inside surface of the shell and will to this extent interrupt the continuity of its reflecting surface, the diffusing character of the inside surface is such that lines of separation will not substantially interfere with the production of the desired inner glow or diffusion of omni-directional light within the shell. The lines of separation are desirably placed outside the normal range of the camera, so that the camera will not see such lines.

The ovoidal shape of the preferred embodiments described and shown serves to exemplify the spheroidal shapes which may be used to produce advantageous omni-directional illumination for photographing small objects. The combination of the spheroidal shape and its diffusely reflecting surface tend to produce diffusion of light which will illuminate a small object placed within the shell from substantially all directions. The object is thus advantageously illuminated for photographic purposes with a basic or primary lighting condition which may be supplemented by additional diffused or direct lighting to produce desired special effects.

What is claimed is:

1. Apparatus for producing substantially omni-directional lighting of an object to be photographed, comprising
   a shell of generally spheroidal shape having an access opening therein through which a camera may view an object within the shell,
   means to support an object within the shell in position to receive light from substantially all directions from the inner surface of the shell so as to be illuminated by such light from substantially all directions,
   said inner surface having light diffusing reflectance characteristics over substantially its entire area,
   said shell being constructed and arranged to permit said surface to be illuminated over a substantial area so as to cause light to be diffusely reflected therefrom to other parts of the surface and from such surface onto an object supported by said support means.

2. Lighting apparatus as in claim 1 in which said shell is an ovoidal shell, and said access opening is at one end thereof.

3. Lighting apparatus as in claim 1 in which the inner surface of said shell, other than any portion thereof included in said support means, is a substantially continuously curved surface having diffusing reflectance characteristics.

4. Lighting apparatus as in claim 2 in which said shell is formed with a flattened bottom portion forming a platform constituting said support means, said shell having an otherwise substantially continuously curved inner surface.

5. Lighting apparatus as in claim 4 in which said flattened bottom portion extends substantially to said access opening.

6. Lighting apparatus as in claim 5 in which said platform is adapted to support a photographic object at an object position spaced inward from said access opening and said shell extends forward and converges beyond such object position so as to reflect light onto the front of an object in such object position.

7. Lighting apparatus as in claim 2 with the addition of a light source to project light from outside through said access opening onto a portion of the inner surface of the shell.

8. Lighting apparatus as in claim 7 in which the shell is opaque.

9. Lighting apparatus as in claim 1 in which the shell is a molded plastics shell.

10. Lighting apparatus as in claim 9 in which the shell is formed in a plurality of separable parts which fit together to form the shell.

11. Lighting apparatus as in claim 1 in which the shell includes a translucent portion, and a light source for projecting light through such translucent portion to illuminate the interior of the shell.

12. Apparatus for producing substantially omnidirectional lighting of a photographic object, comprising
    means for forming about the object a substantially continuous array of diffusely reflecting means substantially surrounding the object and adapted to diffusely reflect light between the elements of such means and therefrom to the object,
    and means to illuminate such array to cause light to be diffusely reflected between such elements and therefrom to the object so as to produce a diffuse glow of light from substantially all directions toward the object.

* * * * *